United States Patent [19]
Robbins, III

[11] Patent Number: 4,973,029
[45] Date of Patent: Nov. 27, 1990

[54] CONDUCTIVE WIRES FOR FENCING SYSTEMS

[76] Inventor: Edward S. Robbins, III, 459 North Court, Florence, Ala. 26360

[21] Appl. No.: 416,468

[22] Filed: Oct. 3, 1989

[51] Int. Cl.$^5$ .............................................. A01K 3/00
[52] U.S. Cl. ................................ 256/10; 174/120 SC; 264/174
[58] Field of Search ............... 174/120 SC, 126.2; 256/10; 264/174

[56] References Cited
U.S. PATENT DOCUMENTS

| | | |
|---|---|---|
| 3,223,796 | 12/1965 | Willoughby . |
| 3,229,012 | 1/1966 | Garner ................................. 264/174 |
| 3,293,800 | 12/1966 | Martinmaas . |
| 3,366,854 | 1/1968 | Robinson . |
| 3,669,413 | 6/1972 | Laible . |
| 3,725,230 | 4/1973 | Bahder et al. . |
| 3,980,277 | 9/1976 | Enoksson . |
| 4,383,133 | 5/1983 | Lanfranconi . |
| 4,732,722 | 3/1988 | Aida et al. ................ 174/120 SC X |
| 4,755,633 | 7/1988 | Standing . |

*Primary Examiner*—Andrew V. Kundrat
*Attorney, Agent, or Firm*—Nixon & Vanderhye

[57] ABSTRACT

An electrically conductive wire particularly for use in fencing systems in enclosed which includes an inner metal conductor, an electrically conductive intermediate layer of plastic material applied over the conductor, and a relatively thin outer sheath applied over the intermediate layer. The thin outer sheath is preferably white to enhance the visibility of the wire, while at the same time being thin enough to permit current to pass therethrough.

21 Claims, 2 Drawing Sheets

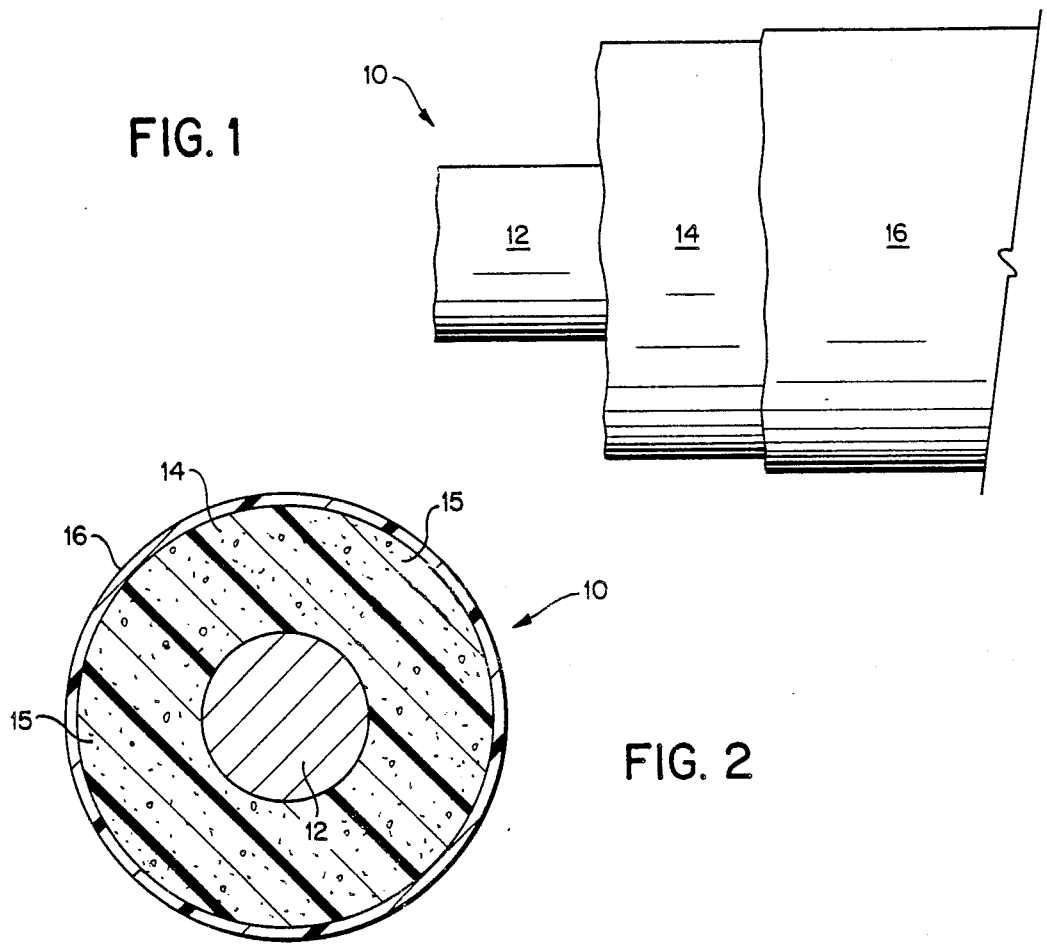
FIG. 1
FIG. 2
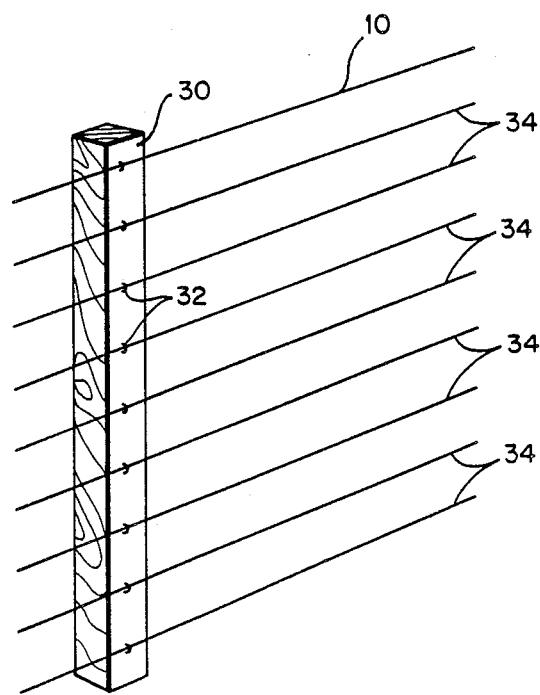
FIG. 4

CONDUCTIVE WIRES FOR FENCING SYSTEMS

BACKGROUND AND SUMMARY OF THE INVENTION

The present invention relates to electrically conductive wires particularly for use in fencing systems used to provide a secure enclosure for livestock, horses, etc.

In the past, it has been known to include electrically conductive wires in fence constructions for the confinement of livestock. Such systems have typically included one or more electrically conductive wires, representative examples of such systems being disclosed in U.S. Pat. Nos. 3,669,413 and 3,223,796. However, bare wire systems such as that disclosed in the 3,669,413 patent are unsatisfactory from the standpoint that they lack aesthetic appeal. Moreover, poor visibility associated with plain or barbed wire fences can lead to painful injury to the animals, and the usually small diameter of such bare wires only exacerbates the potential harm. Improved fencing systems utilizing a single electrically conductive, plastic coated wire in combination with a plurality of vertically spaced plastic webs, and a system using a plurality of vertically spaced electrically conductive, plastic coated wires are disclosed in my copending application Serial No. 008,659, the disclosure of which is incorporated herein by reference.

In non-conductive versions of the plastic coated wire systems described in my above mentioned copending application, the visibility and safety problems are overcome by providing a high tensile strength elongated core wire encased in the relatively thick coating of highly visible, preferably white plastic material. However, in the electrified version, the wires are necessarily made less visible to the livestock or other animals by reason of the manufacturing process by which the wires are made electrically conductive. Specifically, by adding carbon black particles to the plastic composition prior to extrusion over the core wire, the otherwise highly visible plastic sheath material is darkened considerably.

In accordance with the present invention, electrically conductive wires for fencing systems are provided which have the aesthetic appeal of the plastic encased wires disclosed in my prior application along with the desired degree of high visibility, but also have the benefits of electrical conductivity. In accordance with one exemplary embodiment of the present invention, a conductive wire for use in fencing systems is provided which comprises an inner metal conductor wire, a relatively thick intermediate sheath or layer of conductive plastic applied over the conductor wire, and a relatively thin outer sheath of visibility enhanced (preferably white) plastic material applied over the intermediate layer, wherein the outer sheath is sufficiently thin to permit passage of electrical current through the outer sheath.

The core wire is preferably standard electrical wire such as 12½ gauge, polymetric material, cable, etc., and the intermediate plastic layer or sheath, as well as the thin outer sheath, may be polyvinyl chloride, polypropylene and rubber or other thermoplastic olefin polymers or similar materials.

Various conventional techniques may be employed to encase the core wire within the intermediate, conductive plastic sheath, and thin outer sheath. In accordance with one exemplary embodiment, the intermediate plastic layer or sheath is extruded onto the core wire so that the plastic is fixed to the wire strand, i.e., there is no relative sliding motion therebetween. Extruding plastic coatings or layers onto wire strands is not in itself new, and reference is made to U.S. Pat. No. 4,182,382 which discloses a representative prior art plastic extruding technique.

The thickness of the intermediate plastic coating or sheath is such that the outside diameter of the composite strand and intermediate sheath is preferably from at least about 0.050 inch to about 0.75 inch.

The intermediate plastic layer or sheath is made electrically conductive preferably by the incorporation of carbon black particles to the plastic material prior to extrusion.

In accordance with an exemplary embodiment of the invention, the relatively thin outer sheath is subsequently extruded over the intermediate plastic layer, the thickness of this outer sheath being approximately 0.003 to 0.004 inch so that the final outside diameter of the composite wire is not appreciably greater than the 0.50 to 0.75 inch diameter mentioned above. This outer sheath is thus made thin enough to permit the passage of electrical current from the intermediate conductive sheath through the outer sheath so that animals coming into contact with the wire will receive the desired electrical shock which will cause the animals to remain within the confines of the enclosure. The plastic material which comprises the relatively thin outer sheath comprises, preferably, a highly visible white plastic (or other visible color such as yellow) so as to achieve the benefit of high visibility along with the desired electrical conductivity.

In still another aspect, electrically conductive wires of the type described above may be incorporated into a fencing system including a plurality of vertically spaced wires, or within a system incorporating a single electrically conductive wire in combination with one or more vertically spaced plastic webs, as described in my above identified copending application.

Other objects and advantages of the present invention will become apparent from the detailed description of the drawings which follow.

BRIEF DESCRIPTION OF THE DRAWINGS

FIG. 1 is a side view partly broken away, to show the electrically conductive wire construction in accordance with an exemplary embodiment of the invention;

FIG. 2 is a cross sectional view of the wire illustrated in FIG 1;

FIG. 4 is a partial perspective of an alternative fencing system incorporating one or more electrically conductive wires in accordance with this invention.

DETAILED DESCRIPTION OF THE DRAWINGS

Figure 3:
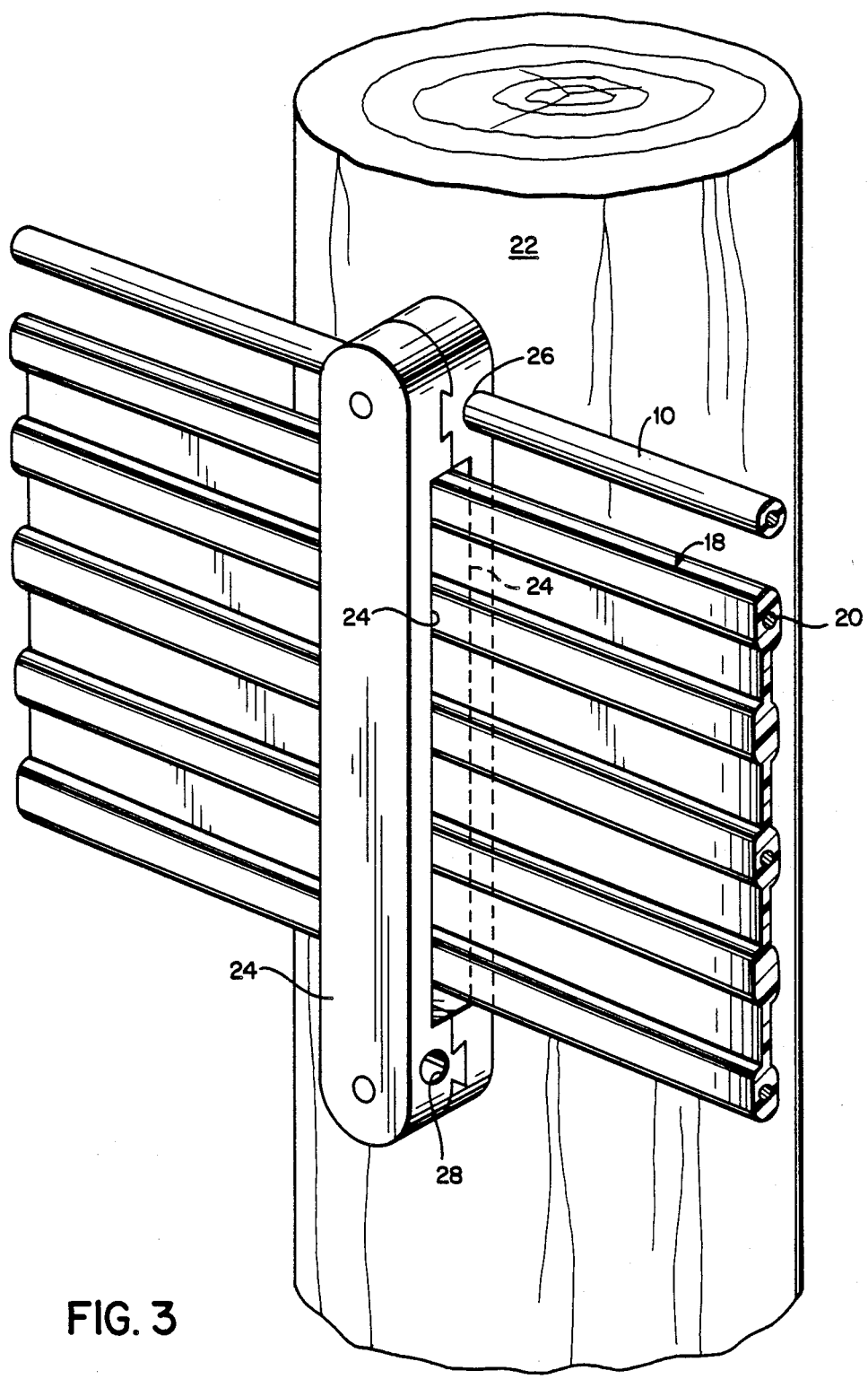
FIG. 3 is a partial perspective view of a fencing system incorporating a single electrically conductive wire in accordance with this invention.

With reference to FIG. 1, an electrically conductive wire 10 includes a core wire 12 which may be a conventional 12½ gauge steel wire, polymetric material, cable, etc., and it will be appreciated that other conventionally used electrically conductive wires may be employed in the present construction as well.

A relatively thick intermediate plastic layer or sheath 14 is applied (preferably extruded) over the core wire 12 and may be formed of polyvinyl chloride, polypropylene with rubber added, or other suitable thermoplastic polymers. However, it is contemplated that any plastic or comparable material may be used as the intermediate sheath. In accordance with a presently preferred embodiment, and using a standard wire gauge of 12½ for the core wire 12, the intermediate plastic sheath should be about 2 to about 7 times the thickness of the core wire for the best results.

In order to render the intermediate sheath 14 electrically conductive, carbon black particles 15 or other similar materials are added to the plastic mix prior to extrusion. As a result of the addition of such particles, the external appearance of the intermediate sheath is somewhat dark, even though the plastic mix may otherwise be of a light color such as white.

A relatively thin outer sheath 16 is subsequently applied (preferably extruded) over the intermediate plastic sheath 14 and, in a presently preferred embodiment, the outer sheath has a thickness of between about 0.003 and 0.004 inch. The outer sheath 16 may be constructed of the same or different plastic material as the intermediate sheath 14, but without the incorporation of carbon black particles 15, and must be a highly visible color, preferably white. The relative thinness of the exterior sheath 16 permits electric current to pass between the core wire 12 and outer sheath 16 through the intermediate sheath 14, while the white color imparts high visibility to the wire. As a result, the finished wire has the desired benefits of both electrical conductivity and high visibility.

Turning now to FIG. 3, an electrically conductive wire 10 in accordance with this invention is shown in combination with a fencing system as described in my above identified copending application. Specifically, the fencing system includes one or more plastic webs 18, reinforced by one or more high tensile strength wires 20 which are held to a fence post 22 by a bracket 24, the construction of which is such that the plastic web 18 is free to slide laterally along the bracket to facilitate tensioning, absorb impact, etc.

An electrically conductive wire 10 in accordance with this invention is located above the plastic web 18 and extends in a direction generally parallel thereto, through an elongated bore 26 formed in the bracket 24. A second electrically conductive wire 10 can be utilized at the lower end of the bracket and a bore or passage 28 is provided to receive a second of such wires.

Turning to FIG. 4, another fencing system substantially as shown in my above identified copending application is illustrated, utilizing the conductive wire 10 in accordance with this invention. A fence post 30 mounts a plurality of horizontally extending plastic sheathed wires by means of conventional staples 32 or other suitable attachment means.

A single electrically conductive wire 10 is shown in combination with a plurality of plastic sheathed (or coated) non-conductive wires 34. These latter wires comprise a core wire and a relatively thick outer sheath similar to sheath 14, but without the carbon black particles. As a result, all of the wires 10 and 34 are highly visible and wire 10 also is electrically conductive.

It will be appreciated that as few as one and as many as all of the wires (in any combination) shown in the FIG. 4 embodiment may be of the electrically conductive type, but two or three conductive wires in a nine wire fence will normally prove sufficient.

It will be appreciated, of course, that the electrically conductive wire of this application has applicability in any fencing system, or in any other environment where an electrically conductive and highly visible wire is required.

Moreover, while the presently preferred embodiment of the electrically conductive wire in accordance with this invention is shown to have a round or circular cross section, it will be appreciated that the intermediate plastic sheath 14 and the relatively thin outer sheath 16 may have other cross sectional shapes, such as oval, semi-circular, or the like. In fact, any cross sectional shape may be employed which enhances the visibility of the wire.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A conductive wire for use in fencing systems comprising:
   (a) an inner metal conductor;
   (b) a relatively thick intermediate layer of conductive plastic applied over said conductor; and
   (c) a relatively thin outer sheath of visibility enhanced plastic material, said outer sheath being sufficiently thin to permit passage of electrical current therethrough.

2. A conductive wire according to claim 1 wherein said outer sheath is colored white.

3. A conductive wire according to claim 1 wherein said intermediate layer contains carbon black particles.

4. A conductive wire according to claim 2 wherein said intermediate layer contains carbon black particles.

5. A conductive wire according to claim 1 wherein said outer sheath has a wall thickness in the range of about 0.003 to 0.004 inch.

6. A conductive wire according to claim 1 wherein said intermediate layer has a thickness of about 2 to about 7 times the diameter of the inner metal conductor.

7. A conductive wire according to claim 5 wherein said intermediate layer has a thickness of about 2 to about 7 times the diameter of the inner metal conductor.

8. A conductive wire according to claim 7 wherein said inner metal conductor comprises 12½ gauge wire.

9. A conductive wire according to claim 1 wherein at least said outer sheath is extruded over said conductor.

10. A conductive wire according to claim 1 wherein said intermediate layer and outer sheath are sequentially extruded over said conductor.

11. A method of forming a conductive wire with enhanced visibility comprising the steps of:
   (a) providing a metal conductor;
   (b) applying over said conductor a relatively thick intermediate layer of conductive plastic material; and
   (c) applying over said relatively thick intermediate layer a relatively thin outer sheath of light color, the outer sheath having a thickness sufficient to permit passage of current therethrough.

12. The method according to claim 11 wherein, in step (b), said intermediate layer is extruded over said conductor.

13. The method according to claim 11 wherein, in step (c), said outer sheath is extruded over said intermediate layer.

14. The method according to claim 11 wherein, during step (b) said intermediate layer is formed with a thickness of from about 2 to about 7 times the diameter of the metal conductor.

15. A method according to claim 11 wherein, during step (c), said outer sheath is applied over said intermediate layer at a thickness of from about 0.003 to about 0.004 inch.

16. A method according to claim 14 wherein, during step (c), said outer sheath is applied over said intermediate layer at a thickness of from about 0.003 to about 0.004 inch.

17. The method according to claim 11 wherein step (b) is carried out utilizing a thermoplastic olefin or vinyl polymer containing carbon black particles for said intermediate layer.

18. The method according to claim 11 wherein step (c) is carried out utilizing a thermoplastic olefin or vinyl polymer containing carbon black particles for said intermediate layer.

19. The method according to claim 17 wherein step (c) is carried out utilizing a thermoplastic olefin or vinyl polymer containing carbon black particles for said outer sheath.

20. A fence system comprising a plurality of fence posts, a plurality of substantially vertically aligned wire strands extending between said fence posts, at least one of said wire strands being an electrically conductive wire comprising
 (a) an inner metal conductor;
 (b) a relatively thick intermediate layer of conductive plastic applied over said conductor; and
 (c) a relatively thin outer sheath of visibility enhanced plastic material, said outer sheath being sufficiently thin to permit passage of electrical current therethrough.

21. A fence system comprising a plurality of fence posts, a plurality of reinforced plastic webs extending between said fence posts, and at least one electrical conductive wire comprising
 (a) an inner metal conductor;
 (b) a relatively thick intermediate layer of conductive plastic applied over said conductor; and
 (c) a relatively thin outer sheath of visibility enhanced plastic material, said outer sheath being sufficiently thin to permit passage of electrical current therethrough.

* * * * *